United States Patent [19]
Solis

[11] 3,860,297
[45] Jan. 14, 1975

[54] VEHICLE WHEEL ACCESSORY MOUNTING FIXTURE AND REMOVABLE ACCESSORIES THEREFOR

[76] Inventor: Cruz Luevano Solis, 1204 Buena Vista, San Antonio, Tex. 78207

[22] Filed: Feb. 5, 1973

[21] Appl. No.: 329,442

[52] U.S. Cl. .............................. 301/38 R, 301/9 DN
[51] Int. Cl. ............................................ B60b 11/00
[58] Field of Search ...... 301/5 B, 9 DN, 38 R, 38 S, 301/40 S, 41 R, 43; 280/150 A

[56] References Cited
UNITED STATES PATENTS

| | | | |
|---|---|---|---|
| 1,904,081 | 4/1933 | Pratt | 301/9 DN |
| 2,126,083 | 8/1938 | Bailey | 280/150 A |
| 2,439,758 | 4/1948 | Sorrentino | 280/150 A |
| 3,024,070 | 3/1962 | Lardin | 301/38 S |
| 3,435,873 | 4/1969 | Weier | 301/41 R |
| 3,653,718 | 4/1972 | Gellender | 301/38 R |
| 3,679,267 | 7/1972 | Zachmann | 301/38 R |
| 3,707,308 | 12/1972 | Smith | 301/38 R |

FOREIGN PATENTS OR APPLICATIONS

| | | | |
|---|---|---|---|
| 813,036 | 2/1937 | France | 301/38 S |

*Primary Examiner*—M. Henson Wood, Jr.
*Assistant Examiner*—Victor N. Sakran
*Attorney, Agent, or Firm*—Ted D. Lee; Donald R. Comuzzi

[57] ABSTRACT

A wheel mounted fixture and cooperating accessory mounted member for the mounting of an accessory on the central portion of a vehicle wheel through the utilization of conventional wheel mounting lugs or nuts. The fixture is mountable on the associated vehicle wheel without removing all of the associated lug nuts. The fixture includes a horizontally outwardly projecting hub portion which releasably receives the accessory member or adapter thereover. The adapter locks to the fixture through spring loaded clip means and torque transmitting ribs.

4 Claims, 7 Drawing Figures

PATENTED JAN 14 1975 3,860,297
SHEET 1 OF 3
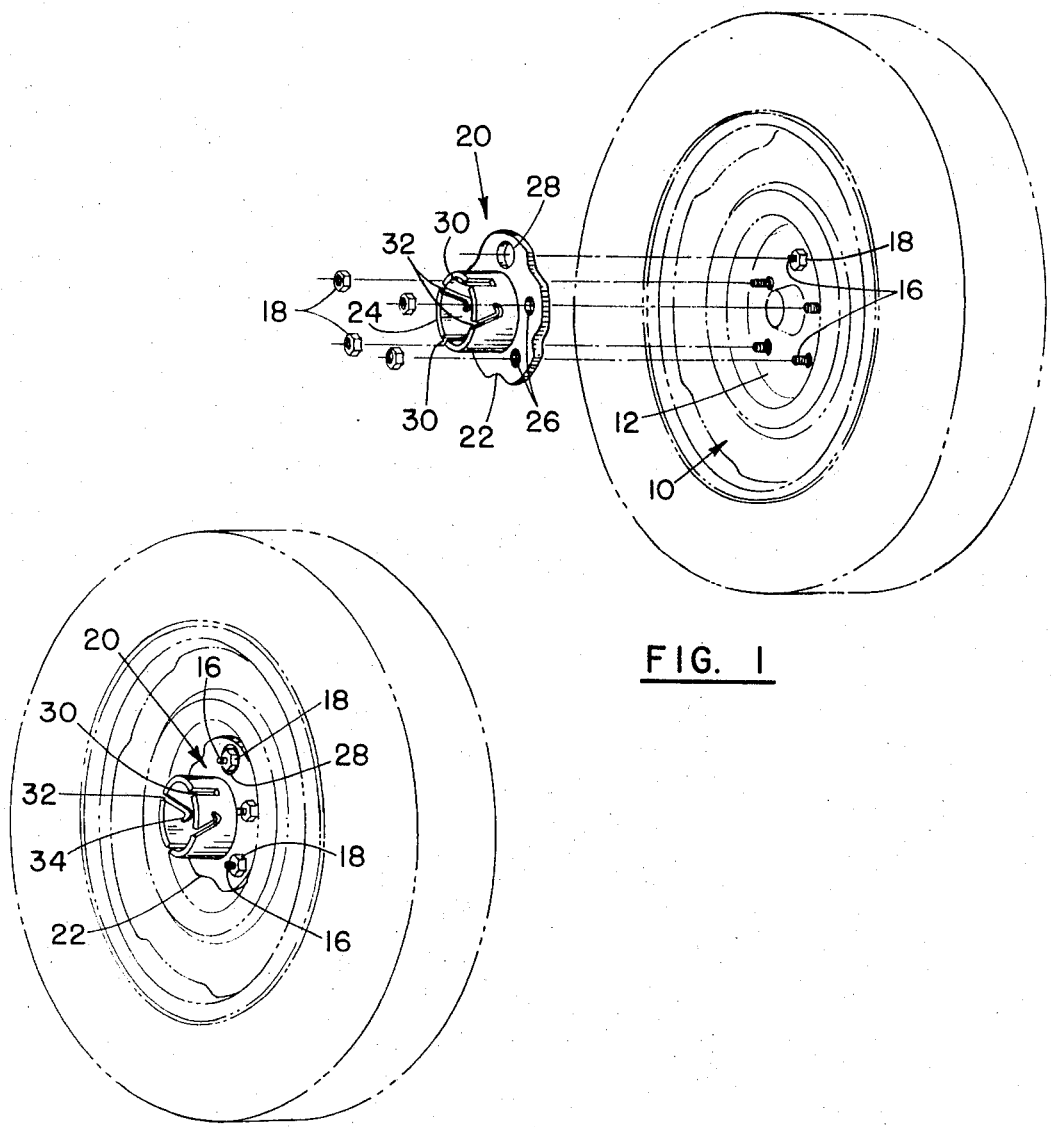
FIG. 1
FIG. 2
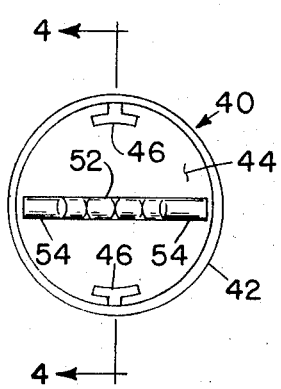
FIG. 3
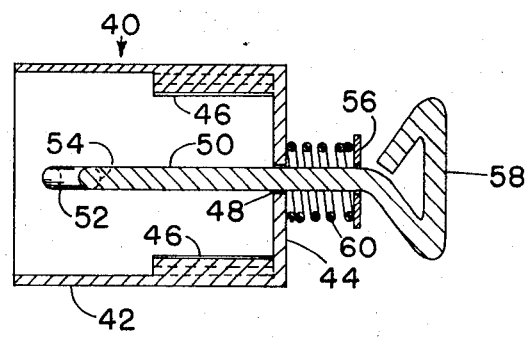
FIG. 4

PATENTED JAN 14 1975 3,860,297

VEHICLE WHEEL ACCESSORY MOUNTING FIXTURE AND REMOVABLE ACCESSORIES THEREFOR

BACKGROUND OF THE INVENTION

Heretofore various attempts have been made to provide for mounting wheel accessories on vehicle wheels. These attempts, for the most part, have necessitated the provision of mounting fixtures which must either be attached to the wheel each time a wheel accessory is to be used or, if permanently mounted, require the use of tools and special fasteners in order to secure the wheel accessory thereto.

This invention provides a vehicle wheel mounting fixture of the type which may be readily mounted upon an existing wheel through the utilization of the lugs conventionally used to secure the associated wheel to its hub, the fixture being so constructed as to enable its permanent retention beneath a conventional hubcap.

It is contemplated that the mounting fixture be mountable on the associated vehicle wheel without requiring the removal of all of the associated nuts, thereby maintaining the wheel secure as the accessory is being mounted.

It is a further feature of this invention that the wheel accessories to be mounted from the fixture may be readily engaged with and disengaged from the mounting fixture without the use of tools and by a person possessing only minimal mechanical ability.

A full understanding of the construction of this invention, together with further novel features and advantages, will be had from the following detailed description of preferred embodiments thereof, taken in conjunction with the attached drawings.

BRIEF DESCRIPTION OF THE DRAWINGS

FIG. 1 is a perspective view of a conventional vehicle wheel mounted on an associated wheel hub by means of studs projecting outwardly through the hub, passed through openings provided therefor about the center of the wheel and having threaded nuts engaged therewith, four of the nuts being illustrated in exploded position together with the accessory mounting fixture portion of the instant invention;

FIG. 2 is a perspective view similar to FIG. 1 but with the mounting fixture portion of the instant invention fully applied and secured to the vehicle wheel;

FIG. 3 is an end elevational view of the wheel accessory center hub portion as seen from the right side of the wheel accessory illustrated in FIG. 2;

FIG. 4 is a vertical sectional view taken substantially upon the plane indicated by the section line 4—4 of FIG. 3;

Figure 5:
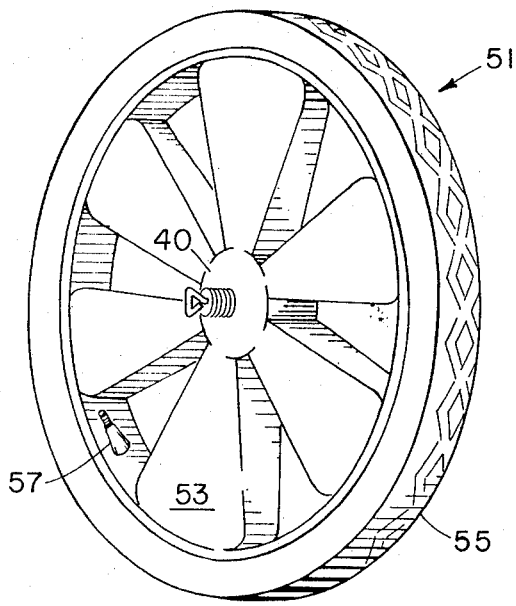
FIG. 5 is a perspective view of a form of wheel accessory.

Referring now more specifically to the drawings the numeral 10 generally designates a conventional vehicle wheel having a pneumatic tire casing 11 mounted thereon. The wheel 10 includes a central portion 12 provided with circumferentially spaced bores 14 through which hub mounted thread studs 16 extend. A plurality of threaded nuts 18 are threadedly engaged on the outer ends of the studs 16 for securing the wheel 10 to the hub.

A vehicle wheel accessory mounting structure or fixture generally referred to by the reference numeral 20 is provided and includes a centrally apertured mounted plate 22 having a cylindrical hub portion 24 projecting outwardly from one side thereof. A plurality of circumferentially spaced bores 26 are formed through the plate 22 about the exterior of the hub portion 24. The bores 26 are of a size to snugly receive the studs 16 therethrough with a single bore 28 being enlarged and of a size to receive one of the nuts 18 therethrough. Accordingly, from FIG. 1 of the drawings it may be appreciated that in order to secure the vehicle wheel accessory mounting fixture 20 to the wheel 10 it is only necessary to remove four of the nuts 18 and to thereafter place the plate 22 over the outer surface of the central portion 12 of the wheel 10 with the remaining wheel retaining nut 18 received through the bore 28 and the other studs 16 received through the bores 26. Thereafter, the removed nuts 18 may be again threaded on the studs 16 to secure the fixture 20 to the wheel 10. This manner of mounting the fixture 20 on the wheel 10 is significant as it provides for a positive retention of the wheel 10 at all times which in turn eliminates the necessity of jacking the wheel 10 up from the ground when mounting the accessory.

As may best be seen from FIG. 1 of the drawings the hub portion 24 of the fixture 20 includes diametrically opposite longitudinally extending radial slots 30 and diametrically opposite bayonet slots 32 including slightly reentrant inner end portions 34. The purpose of the slots 30 and 32 is to secure an accessory mounted adapter 40 as will be hereinafter more fully set forth.

The specific structure mounts the accessory adapter 40, which can accommodate a variety of accessories, may be seen to best advantage in FIGS. 3, 4 and 9 of the drawings wherein it will be noted that the adapter 40 includes a cylindrical body 42 having an end wall 44 closing its outer end. The cylindrical body 42 moutns longitudinally extending generally T-shaped torque accommodating internal ribs 46 disposed diametrically opposite each other. The end wall 44 is centrally apertured as at 48 and has an elongated axially extending shank member 50 and slidably received therethrough. The inner end of the shank member 50 adjacent the open end of the cylindrical body 42 is provided with a crosshead 52 extending generally along a diameter of the cylindrical body 42. The free end portions of the crosshead 52 are slightly rearwardly offset as at 54 toward the closed end of the cylindrical body 42. It will further be noted that the free ends of the crosshead 52 terminate but a slight distance inwardly of the inner surface of the cylindrical body 42.

The end portion of the shank member 50 remote from the crosshead 52 and outward of end wall 44 is provided with a circumferentially extending radially outwardly projecting abutment flange 56 and a contoured handle portion 58 on the terminal end thereof. A compression spring 60 is disposed about the shank member 50 between the abutment flange and the outer surface of the end wall 44 and thereby serves to yieldingly bias the shank member 50 toward an outwardly displaced position.

When applying the adapter 40 and associated wheel accessory to the mounting fixture 20 after the latter has been secured to the wheel 10, the cylindrical body 42 of the hub 40 has its open end telescoped over the outer free end of the hub portion 24. The handle 58 is turned to register the free ends of the crosshead 52 with the open ends of the slots 32 for movement thereinto with the T-shaped ribs 46 being slidingly received in the slots 30 and overlying the inner surfaces of the hub portion 24 on inner sides of slots 30. After the ribs 46 have been seated in the inner ends of the slots 30, the handle 58 is pushed inwardly and rotated to seat the opposite ends of the crosshead 52 in the inner ends 34 of the slots 32. The handle 58 is then released with spring 60 slightly retracting the opposite ends of the crosshead 52 into the inner end portions 34 of the slots 32. As will be appreciated, the adapter 40, and hence the accessory, is thus fixedly mounted in a manner which would require manual manipulation of the adapter 40 to affect its removal. Further, while the spring loaded crosshead 52 mounts the adapter 40, the opposed ribs 46 constitute the load accommodating means or torque transferring members.

With attention now invited to FIG. 5 of the drawings, there may be seen a form of wheel accessory referred to by reference numeral 51. The wheel accessory 51 comprises a rigid wheel 53 having the central hub portion or mounting adapter 40 and an outer periphery mounting a pneumatic tire 55 inflatable through a valve 57. The wheel accessory 51 comprises a spare wheel which may be secured, through the adapter, over the outside of the wheel 10 in the event the pneumatic tire 12 loses its air. It is of course to be understood that the tire 55 is deflated prior to installation and inflated once it is installed. This will enable the disabled vehicle to be moved to a service area without the need for changing the defective tire.

Figure 6:
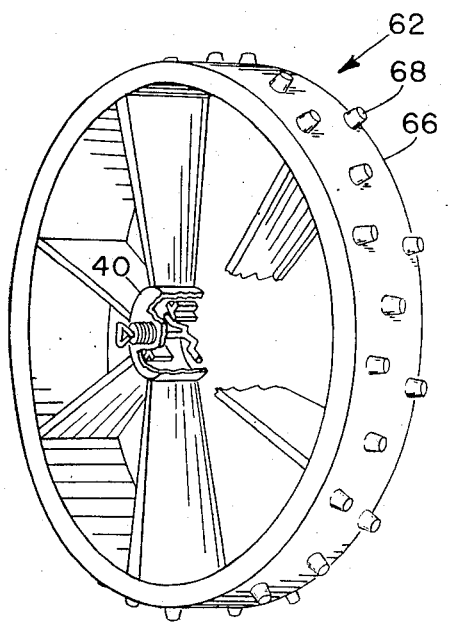
FIG. 6 is a perspective view of a traction wheel accessory.

A further form of wheel accessory is illustrated in FIG. 6 and is referred to by reference numeral 62. The accessory 62 includes the hub 40 and may therefore be readily removably engaged with the fixture 20. The wheel accessory 62 includes an outer circumferential band 66 provided with radially outwardly projecting lugs 68 for added ground traction in snow, ice, mud, etc. The band 66 may be either of the inflatable type or non-inflatable type as desired. Furthermore, it may be desirable to elongate the adapter 40 to permit the accessory 62 to be mounted outside the vehicle fender.

Figure 7:
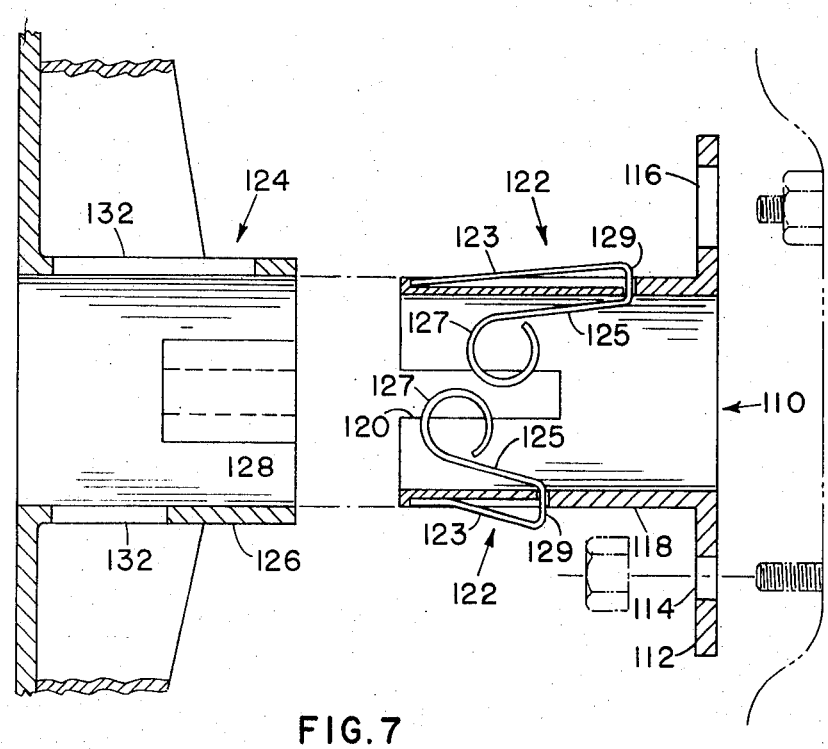
FIG. 7 is a vertical sectional view of a second form of vehicle wheel accessory mounting fixture illustrated in exploded position relative to an associated vehicle wheel and with a corresponding vehicle wheel accessory illustrated in exploded relation relative to the mounting fixture.

In FIG. 7 of the drawings there is illustrated a modified form of mounting arrangement including a fixture referred to in general by the reference numeral 110. The fixture 110 is similar to the fixture 20 in that it includes a base plate 112 having a plurality of small stud receiving bores 114 formed therethrough as well as a larger nut receiving bore 116. In addition, the fixture 110 includes a hub portion 118 having diametrically opposite longitudinal slots 120 formed therein corresponding to the slots 30. However, in lieu of the bayonet slots 32 provided in the hub portion 24, the hub portion 118 includes diametrically opposite spring clips 122. These clips 122 each project through the hub wall and include an outer leg 123 fixed to the outer surface of the hub and a free inner leg 125 terminating in a looped end 127. An outwardly projecting shoulder 129 is formed between legs 123 and 125.

A wheel accessory adapter 124, also illustrated in FIG. 12, includes a hub portion 126 corresponding to the hub portion 40 and provided with internal T-shaped ribs 128 similar to the ribs 46 for reception within slots 120. However, in lieu of the shank member 50 and crosshead 52 of the hub portion 40, the hub portion 126 includes diametrically opposite axially extending closed ended slots 132 into which the spring clip shoulders 129 are radially projectible as the hub portion 126 telescopes over the hub portion 118. Accordingly, it may be seen that the wheel accessory 124, while capable of being positively locked to the fixture, may be readily removed therefrom, the release of the hub portion requiring an outward pulling on the looped ends 127. Incidently, it will be noted that the spring clips 122 and related slots 132 can be longitudinally offset to require a specific alignment of the accessory. This modified form of mounting arrangement may be desirable for use on wheels with a projecting wheel hub such as the front wheels of automotive vehicles.

It is to be understood that the mounting fixture illustrated in FIG. 7 may be used in lieu of the mounting fixture illustrated in FIGS. 1 – 4 with any of the accessories described herein.

As previously indicated, the T-shaped ribs of the various adapter hubs of the wheel accessories key into the corresponding slots of the fixture in order to lock the hubs to the fixture for the transfer of torque from the fixture to the hubs. In addition, the spring urged locking members of the various wheel accessory hubs serve to maintain the wheel accessories of the associated fixtures 20 against outward axial shifting relative thereto.

Having described the invention, it will be appreciated that some modifications may be made to the precise configuration, without departing from the scope or spirit of the invention as defined by the following claims.

I claim:

1. A wheel accessory mounting fixture for removably securing wheel accessories to a vehicle wheel, said mounting fixture comprising a mounting plate having a plurality of bores formed therethrough in a pattern adapted to conform to the lug pattern of an associated wheel, all but one of said bores being of a predetermined small diameter and said one bore being of a larger diameter, the small diameter bores being adapted to receive conventional wheel mounting lugs therethrough and the larger diameter bore being adapted to receive a conventional wheel mounting lug nut therethrough, said plate, in the central area of said pattern, including wheel accessory mounting structure projecting outwardly therefrom and adapted to have a wheel accessory removably supported therefrom.

2. A wheel accessory and mounting fixture therefor, said fixture comprising a first component including means for removably semi-permanent securement to a mounted vehicle wheel in the central portion of the latter, and a second component affixed to the wheel accessory, said first and second components including first and second co-acting portions releasably engaged with each other by supporting said accessory from said wheel and for the transfer of torque from the wheel through the fixture to the accessory;

said first and second co-acting portions comprise telescopically engaged cylindrical hub portions, one of said hub portions including circumferentially spaced endwise outwardly opening longitudinal slots and the other of said hub portions including generally radially extending ribs keyed and slidably received in said slots for the transfer of rotational torque from one hub portion to the other hub portion.

3. The combination of claim 2 wherein said hub portions include coacting releasably engaged latch means preventing relative axial displacement of said hub portions relative to each other.

4. The combination of claim 3 wherein said releasably engaged latch means includes bayonet slots opening endwise outwardly of one of said hub portions and a central spring loaded axially shiftable crosshead supported from the other hub portion, said crosshead having opposed ends are seatable in the inner ends of said bayonet slots, said bayonet slots being formed in the inner telescopingly engaged hub portion.

* * * * *